United States Patent
Saha

(10) Patent No.: US 11,757,766 B2
(45) Date of Patent: Sep. 12, 2023

(54) REFLECTION ROUTE FOR LINK LOCAL PACKET PROCESSING

(71) Applicant: VMware, Inc., Palo Alto, CA (US)

(72) Inventor: Aviraj Saha, Milpitas, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/421,318

(22) Filed: May 23, 2019

(65) Prior Publication Data
US 2020/0374219 A1   Nov. 26, 2020

(51) Int. Cl.
  *H04L 45/00* (2022.01)
  *H04L 45/64* (2022.01)
  *G06F 9/455* (2018.01)
  *H04L 101/622* (2022.01)

(52) U.S. Cl.
  CPC .......... *H04L 45/34* (2013.01); *G06F 9/45558* (2013.01); *H04L 45/64* (2013.01); *H04L 45/72* (2013.01); *G06F 2009/45595* (2013.01); *H04L 2101/622* (2022.05)

(58) Field of Classification Search
  CPC ...................................................... H04L 45/34
  See application file for complete search history.

(56) References Cited

U.S. PATENT DOCUMENTS

| | | | | |
|---|---|---|---|---|
| 8,447,884 B1 * | 5/2013 | Baumann | .............. | H04L 61/103 |
| | | | | 709/216 |
| 10,505,847 B1 * | 12/2019 | Singarayan | ........... | H04L 45/745 |
| 2015/0281042 A1 * | 10/2015 | Agarwal | ................ | H04L 45/64 |
| | | | | 709/238 |
| 2018/0241622 A1 * | 8/2018 | Chanda | ................... | H04L 41/12 |
| 2019/0387465 A1 * | 12/2019 | Gandhewar | ........... | H04W 28/24 |

* cited by examiner

*Primary Examiner* — Chi H Pham
*Assistant Examiner* — Raul Rivas
(74) *Attorney, Agent, or Firm* — Barta, Jones & Foley, PLLC

(57) ABSTRACT

A method receives a request packet from a workload at a first logical interface of a logical router and determines that a source address is a first link local address for the workload and a destination address is a second link local address for the first logical interface. A second logical interface includes the second link local address. The method stores an identifier for the first logical interface as an egress interface. The identifier distinguishes the first logical interface from the second logical interface. A service is performed for the request packet and a response packet is generated. The response packet includes the source address of the second link local address for the first logical interface and the destination address of the first link local address for the workload. The method uses the identifier to select the first logical interface as the egress interface to send the response packet.

21 Claims, 5 Drawing Sheets

306

| Network destination | Egress interface |
|---|---|
| 502 Reflection route Fe80/16 | |

| Network destination | Next hop |
|---|---|
| 502 Reflection route Fe80/16 | VNI #1 of LIF #1 |

REFLECTION ROUTE FOR LINK LOCAL PACKET PROCESSING

BACKGROUND

Hosts on a network segment may send request packets to a router. These packets that are sent to the router may be "interface" packets or "prefix" packets. The prefix packets are routed by the router. The interface packets are not routed, but rather the router may locally provide services for the packet, such as layer 3 services. After providing the layer 3 services, the router generates a response packet based on the provided services and sends the response packet back to the workload that sent the request packet.

The interface packets are sent to a link local address for an interface of the router. A link local address is a network address used for communications within a network segment (e.g., a subnet or a link) in which a host is connected. Packets sent to link local addresses are not routed beyond the network segment.

A logical router may service multiple network segments and include multiple logical interfaces. Typically, the link local address of a logical interface is based on a media access control (MAC) address of the router. However, the logical router is assigned a single virtual MAC (VMAC) address. Accordingly, each logical interface includes the same link local address because each link local address is calculated using the same VMAC address of the logical router.

The response packet may include a source address of the link local address of the logical interface for the logical router and a destination address of the workload that sent the request packet. However, when sending the response packet back to the link local address of the workload, the router does not know which logical interface to use to send the response packet because the link local addresses of the logical interfaces are the same. This may result in a failure and the logical router may drop the packet. This problem does not exist when using physical routers as each network segment includes its own physical router that includes a different MAC address and different link local addresses for interfaces.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings:

FIG. 5A shows an example of a reflection route table according to some embodiments.

FIG. 5B depicts an example of the reflection route table after copying of the ingress interface to the egress interface of the reflection route according to some embodiments.

DETAILED DESCRIPTION

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein.

A workload of a host sends a request packet to a logical router. The logical router performs local services for the request packet when the request packet is directed to a link local address of a logical interface of the logical router. When the request packet is to be processed locally by the logical router instead of being routed to another workload, the logical router may store an identifier for the logical interface in which the request packet was received. The identifier may uniquely identify the logical interface from other logical interfaces of the logical router. As discussed above, the logical interfaces for the logical router include the same link local address. However, the logical interfaces may include different identifiers, such as virtual network identifiers. In some embodiments, the logical router stores a route, referred to as a reflection route, in a reflection route table that includes the identifier for the first logical interface. After performing the service for the request packet and generating a response packet that includes a link local address of the workload as the destination and the link local address of the logical interface for the logical router, the logical router uses the identifier to determine which logical interface to use as the egress interface for the response packet. Then, the logical router can send the response packet back to the workload using the correct logical interface. This avoids any dropping of packets that are sent for local processing at the logical router and overcomes the problem of the logical router having the same link local address for each logical interface.

System Overview

Figure 1:
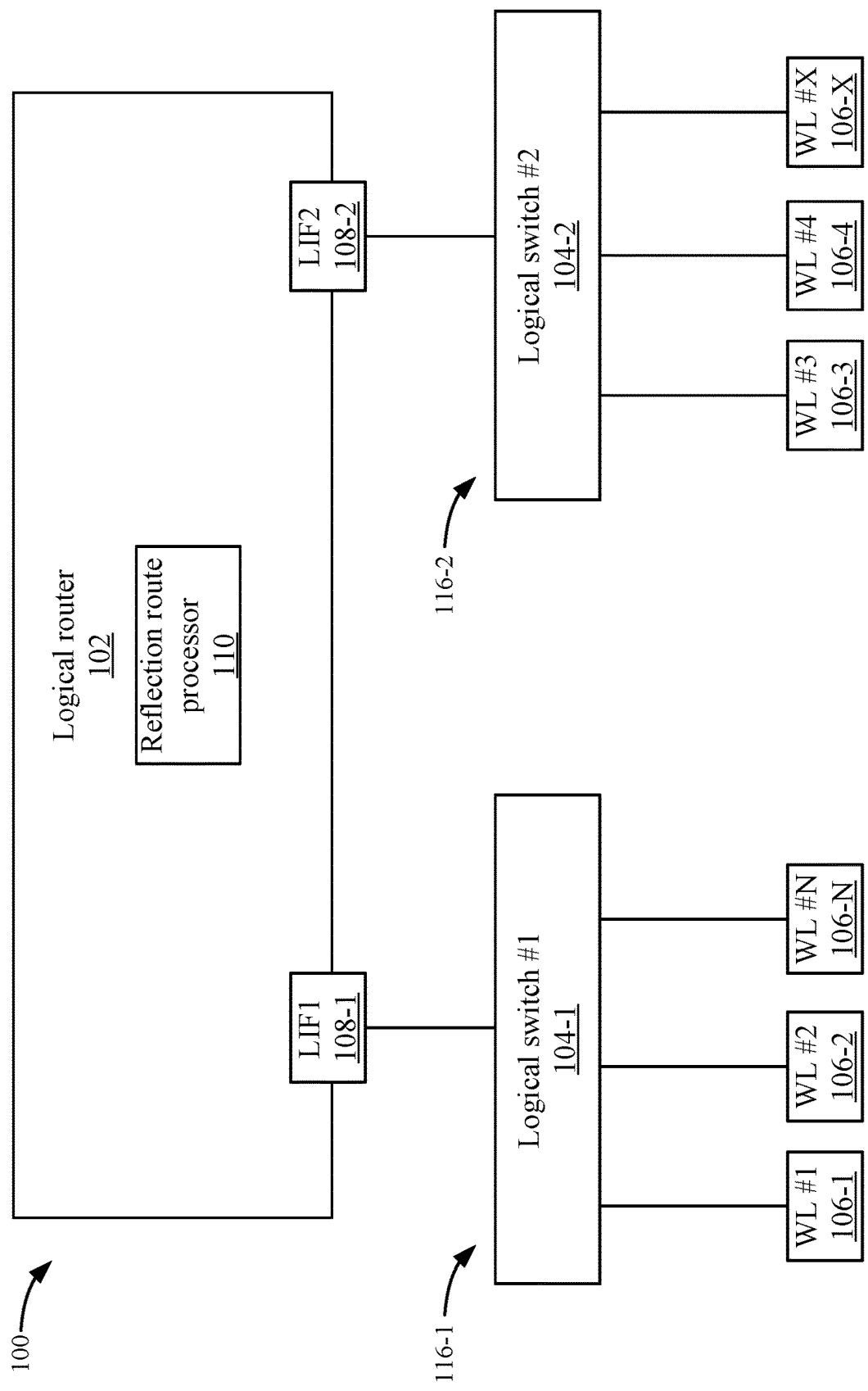
FIG. 1 depicts a system of a network that uses a logical router to route packets to some embodiments.

FIG. 1 depicts a system 100 of a network that uses a logical router 102 to route packets to some embodiments. Logical router 102 may be a virtualized router for multiple network segments. Logical router 102 may be connected to different logical networks 116, which may be network segments, links, or subnets. For example, logical networks 116-1 and 116-2 are connected to logical router 102. FIG. 1 depicts a conceptual diagram of logical network topology.

Logical router 102 routes traffic at L3 (layer 3—network layer) between different logical networks. Specifically, logical router 102 routes network traffic between two or more logical switches 104 based on a set of routing tables. In some embodiments, logical router 102 is implemented in a single managed switching element while in other embodiments a logical router is implemented in several different managed switching elements in a distributed manner. Logical router 102 routes the network traffic at the L3 between the logical networks 116-1 and 116-2. Specifically, logical router 102 routes the network traffic between the two logical switches 104-1 and 104-2.

Logical switches 104 are implemented across several managed switching elements (not shown). Logical switch 104-1 routes network traffic between workloads 106-1 to 106-N at L2 (layer 2). That is, logical switch 104-1 makes switching decisions to route network data at the data link layer between workloads 106-1 to 106-N based on one or more forwarding tables (not shown) that the logical switch has. Logical switch 104-1, along with several other logical switches (not shown), routes the network traffic for the logical network 116-1. Logical switch 104-2 is another logical switch that routes the traffic between workloads 106-3 to 106-X for logical network 116-2.

Workloads 106 are machines that are capable of exchanging data packets. For instance, each workload 106 has a network interface controller (NIC) so that applications that execute on respective workloads 106 can exchange data between them through logical switches 104 and logical router 102. Workloads may refer to virtual machines that are running on a respective host, but this is one example of a virtualized computing instance or compute node. Any suitable technology may be used to provide a workload. Workloads may include not only virtual machines, but also containers (e.g., running on top of a host operating system without the need for a hypervisor or separate operating system or implemented as an operating system level virtualization), virtual private servers, client computers, etc. The workloads may also be complete computation environments containing virtual equivalents of the hardware and software components of a physical computing system. Also, as used herein, the term hypervisor may refer generally to a software layer or component that supports the execution of multiple workloads including system-level software that supports name space containers.

In operation, logical switches 104-1 and 104-2 and logical router 102 function like switches and routers. For instance, logical switch 104-1 routes data packets originating from one of workloads 106-1 to 106-N and heading to another of workloads 106-1 to 106-N. When the logical switch 104-1 in the logical network 116-1 receives a data packet that is destined for one of workloads 106-3 to 106-X in logical network 116-2, logical switch 104-1 sends the packet to the logical router 102. Logical router 102 then routes the packet, based on the information included in the header of the packet, to the logical switch 104-2. Logical switch 104-2 then routes the packet to one of workloads 106-3 to 106-X. Data packets originating from one of workloads 106-3 to 106-X are routed by the logical switches 104-1 and 104-2 and the logical router 102 in a similar manner.

The logical networks 116-1 and 116-2 are different in that workloads in each network use different L3 addresses. For instance, the logical networks 116-1 and 116-2 are different IP subnets for two different departments of a company. Although not shown, logical router 102, logical switches 104 and workloads 106 may be distributed and instantiated on hypervisors of one or more host computing devices. Host computing devices may include an instance of logical router 102 and/or an instance of logical switch 104. For example, host computing devices associated with workload #1 106-1 to workload #N 106-N on logical network 116-1 may run instances of logical switch #1 104-1 and host computing devices associated with workload #3 106-1 to workload #X 106-X on logical network 116-2 may run instances of logical switch #2 104-2. Host computing devices in logical network 116-1 and logical network 116-2 may also be running an instance of logical router 102. Further details of logical routers and logical switches are described in U.S. patent application Ser. No. 13/589,062, entitled "DISTRIBUTED LOGICAL L3 ROUTING", filed Aug. 17, 2012 (now U.S. Pat. No. 9,369,426), which claims priority to U.S. provisional application No. 61/524,754, filed on Aug. 17, 2011, U.S. provisional application No. 61/643,753394, filed on May 6, 2012, U.S. provisional application No. 61/654,121, filed on Jun. 1, 2012, and U.S. provisional application No. 61/666,876, filed on Jul. 1, 2012, all which are incorporated by reference in their entirety.

Logical router 102 includes logical interfaces 108 that are used to connect to different logical networks 116. For example, a logical interface LIF1 108-1 connects to logical switch #1 104-1 of logical network 116-1 and a second logical interface LIF2 108-2 connects to logical switch #2 104-2 of logical network 116-2. Workloads from each respective logical network 116 communicate with logical router 102 through respective logical interfaces.

Link local addresses are addresses that are uniquely confined to a link, such as a specific logical network 116. Outside of the link, the link local address may not be unique. A global address, which is an address that is unique among multiple logical networks, can be used to identify workloads in other logical networks. For example, a workload #1 106-1 may use a link local address for workload #2 106-2 to forward a packet from workload #1 to workload #2. However, to route a packet from workload #1 106-1 in logical network 116-1 to workload #3 106-3 in logical network 116-2, workload #1 106-1 uses a global address that uniquely identifies workload #3 106-3 globally outside of logical network 116-2.

Logical interfaces 108 of logical router 102 include link local addresses also. The link local address is determined by a media access control (MAC) address of logical router 102. However, because logical router 102 is a virtual router, logical router 102 includes only a single virtual MAC address (VMAC). This means that logical interface LIF1 108-1 and logical interface LIF2 108-2 include the same link local address. Logical interface LIF1 108-1 may include a different global address than logical interface LIF2 108-2, but the global address is not used when performing local processing of packets.

Figure 2:
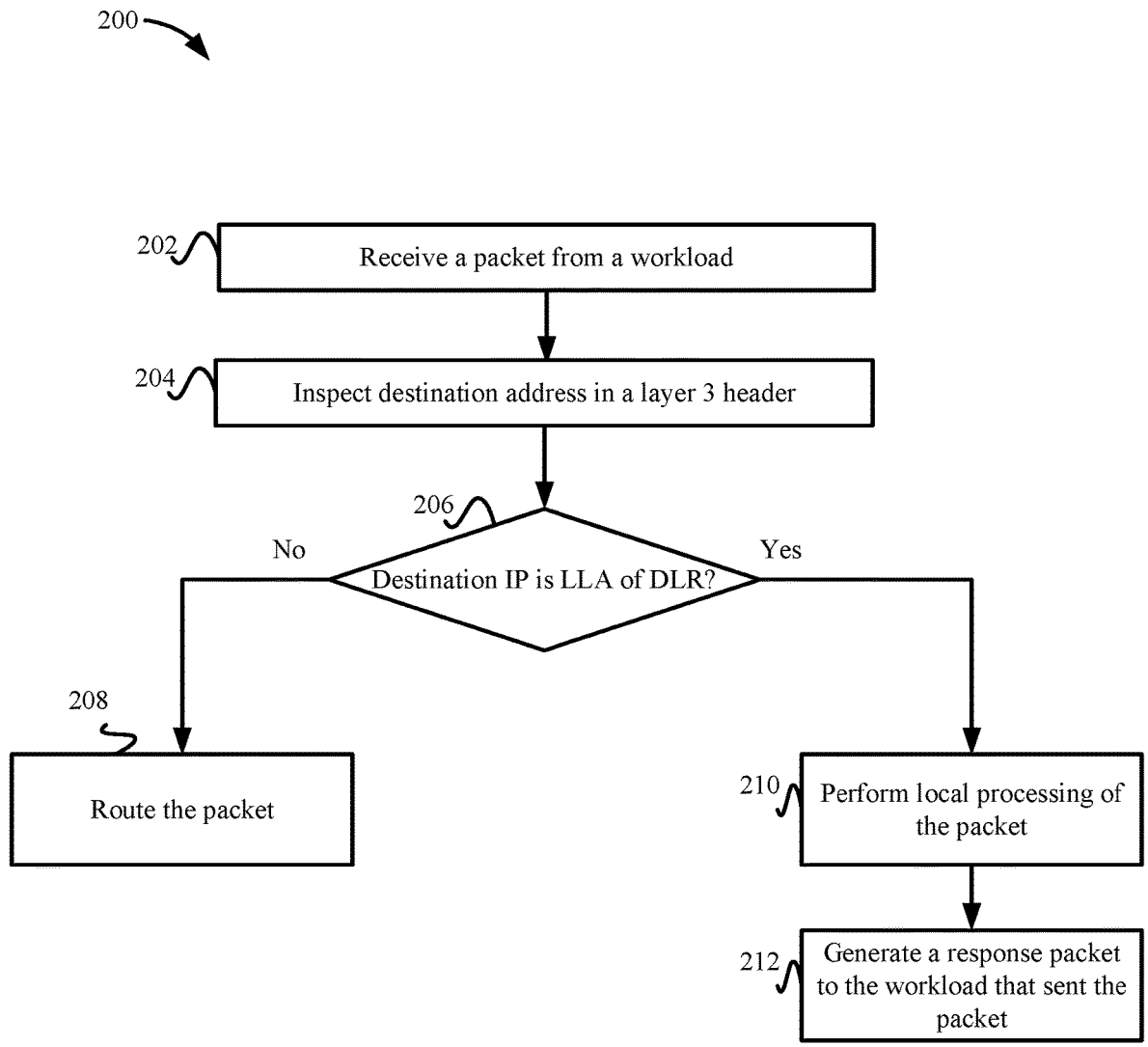
FIG. 2 depicts a simplified flowchart of a method for processing different types of communications according to some embodiments.

Logical router 102 processes different types of communications, such as routing packets between logical networks 116, and locally processing packets. Logical router 102 may also route packets to external networks. FIG. 2 depicts a simplified flowchart 200 of a method for processing different types of communications according to some embodiments. For example, as discussed above, logical router 102 may process interface routes and prefix routes. At 202, logical router 102 receives a packet from a workload 106 of a host. At 204, logical router 102 inspects a layer 3 header for the packet. The request packet includes a layer 2 header and a layer 3 header. The layer 2 header may have a source address of a MAC address of the host and a destination address directed to a destination MAC address of logical router 102. The layer 3 header may have a source address of a link local address of the host and a destination address that could be different depending on whether the request packet is for an interface route or a prefix route. The request packet includes the link local address of logical interface 108 of logical router 102 and a prefix packet would include an address for another entity.

At 206, packet handler 302 determines if the destination address is a link local address of logical router 102. If not, then this is a prefix route, and at 208, logical router 102 routes the packet using a routing table. For example, logical router 102 may look up the destination in the routing table to determine the next hop for the request packet.

If the destination address is the link local address of logical router 102, this communication is an interface route that is requesting a service to be performed locally at logical router 102, such as layer 3 (L3) services, which are performed at 210. An example of an interface route is an ECHO request from a workload 106 to a link local address of a logical interface 108 from a link local address of a workload 106. Then, at 212, logical router 102 generates a response packet to the workload 106 that sent the packet. The service performed may be a layer 3 service and logical router 102 terminates the connection. Upon performing the service, logical router 102 generates a new response packet to be sent back to workload 106. The response packet includes a layer 2 header that includes a source address of a MAC address of logical router 102 and a destination address directed to a destination MAC address of workload 106. The layer 3 header includes a source address of a link local address of logical router 102 and a destination address of the link local address of workload 106.

When logical router 102 sends the response packet, the source address is the link local address for a logical interface, which matches the link local addresses for all the logical interfaces of logical router 102. Accordingly, logical router 102 needs to determine which logical interface 108 to send the response packet. Referring to FIG. 1, logical router 102 includes a reflection route processor 110 to select the correct egress interface for the response packet.

Reflection Route Processing

Figure 3:
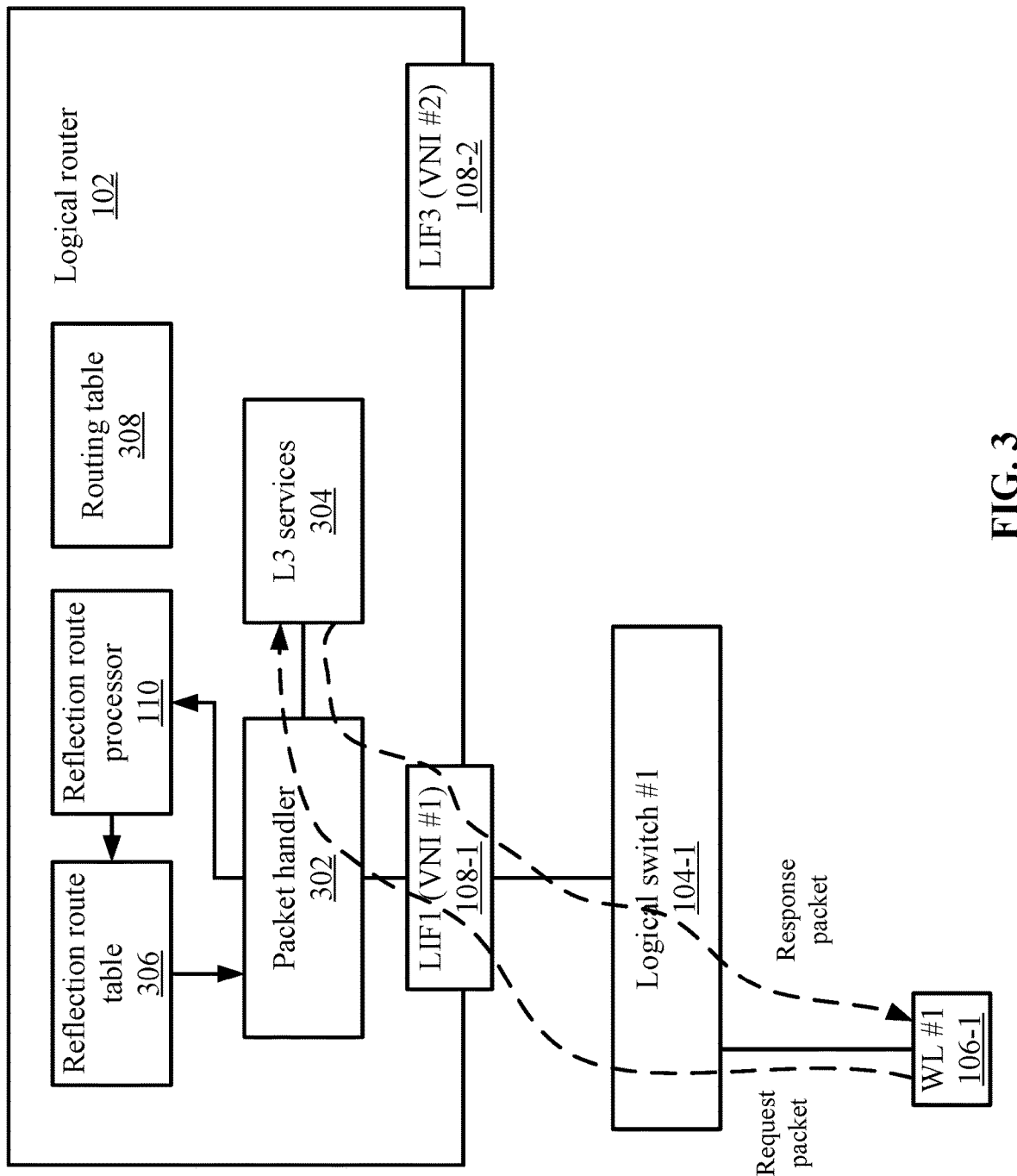
FIG. 3 depicts the processing for interface route packets directed to the link local address of the logical router according to some embodiments.

FIG. 3 depicts the processing for interface route packets directed to the link local address of logical router 102 according to some embodiments. Logical router 102 includes a packet handler 302 that processes incoming and outgoing packets. L3 services 304 may perform layer 3 services, such as processing ECHO requests. A routing table 308 includes routes that logical router 102 uses to route packets when prefix routes are processed. Reflection route processor 110 uses a reflection route table 306 when interface routes are processed. The following will describe the use of reflection route table 306 when processing interface routes in more details.

In this example, a workload #1 106-1 sends a request packet with a layer 3 header that includes a source address of the link local address of workload #1 106-1 and a destination address of the link local address of logical interface LIF1 108-1. The request packet is sent through logical switch #1 104-1 and received at logical interface LIF1 108-1. A packet handler 302 of logical router 102 then processes the request packet. In this example, packet handler 302 determines that the request packet should be locally processed by logical router 102 because the packet is directed to a link local address of logical interface LIF1 108-1 and not routed to another workload 106 using routing table 308. Packet handler 302 then knows that this is an interface route and processes the packet as described below such that logical router 102 will know which egress interface to send the response packet.

Figure 4:
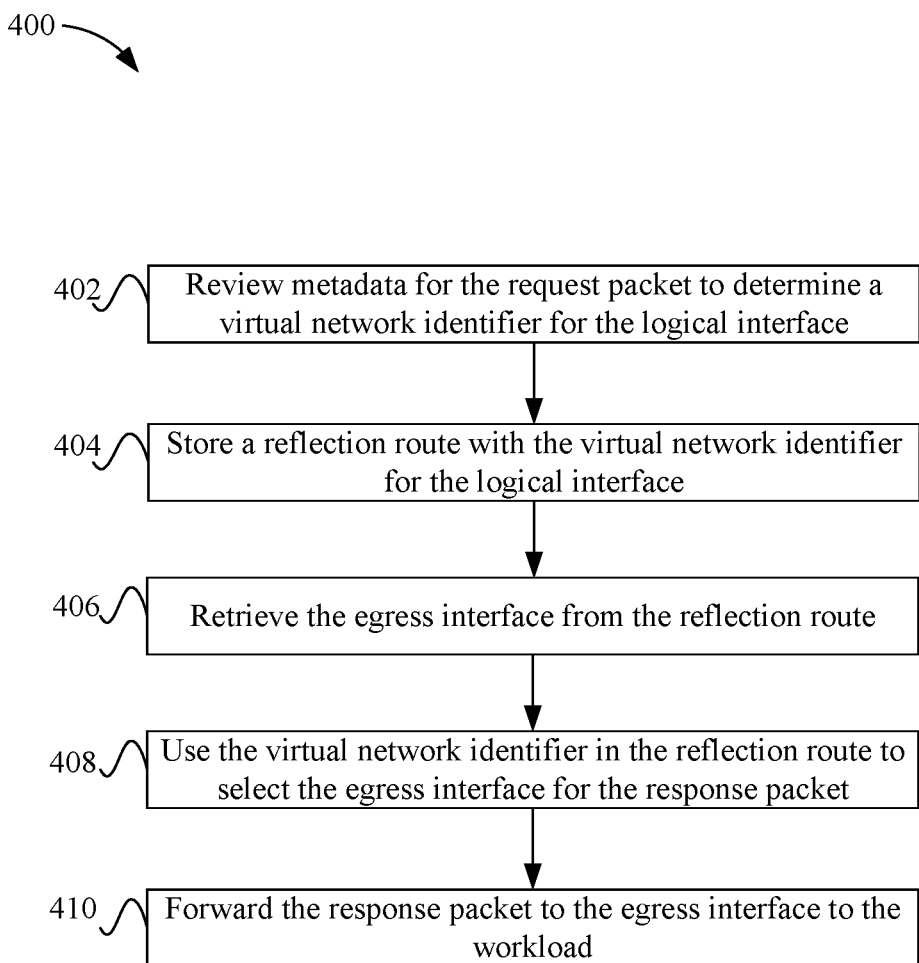
FIG. 4 depicts a simplified flowchart of a method for processing an interface route according to some embodiments.

FIG. 4 depicts a simplified flowchart 400 of a method for processing an interface route to determine the egress interface according to some embodiments. At 402, packet handler 302 reviews metadata for the request packet to determine information that uniquely identifies logical interface LIF1 108-1 in logical router 102. For example, the information may be a virtual network identifier for logical interface LIF1 108-1. Logical interfaces 108 may have the same link local address; however, logical interfaces 108 may include different virtual network identifiers. For example, the virtual network identifier for logical interface LIF1 108-1 may be virtual network identifier (VNI) #1. This distinguishes logical interface LIF1 108-1 from logical interface LIF2 108-2, which has a virtual network identifier of VNI #2. The virtual network identifier may not depend on the link local address. Rather the VNI is assigned to a logical interface from a pool of addresses when the logical interface is assigned to a logical switch. Once a virtual network identifier is assigned to a logical interface from the pool, the VNI is not assigned to another logical interface. Although a virtual network identifier is described, other information that uniquely identifies logical interface LIF1 108-1 from other logical interfaces on logical router 102 may be used.

At 404, reflection route processor 110 stores a reflection route in reflection route table 306 with the virtual network identifier VNI #1 for logical interface LIF1 108-1. For example, reflection route table 306 may include a route that is designated as a reflection route. In some embodiments, the reflection route may be defined by a prefix of Fe80/16 if using Internet Protocol Version 6 (IPv6), which is a 128 bit route. However, the reflection route may be defined by other prefixes, such as a 32 bit prefix in IPv4. The Fe80/16 is a 128 bit route that is not forwarded in IPv6, but rather processed locally. Other routes may also be used other than a Fe80/16 prefix, however.

FIG. 5A shows an example of reflection route table 306 according to some embodiments. The reflection route in reflection route table 306 may be associated with a next hop of an egress interface. The next hop egress interface is used in the routing of the response packet when a reflection route is used. The next hop egress interface is different than routing entries in a routing table 308 of FIG. 3. For example, routing table 308 typically includes fixed routing entries that include a network destination and a next hop egress interface. The next hop egress interface in routing table 308 is fixed and not changed dynamically, such as not changed with a request packet is received. However, for a reflection route in reflection route table 306, an egress interface is not fixed. Rather, reflection route processor 110 dynamically sets the ingress interface of the request packet as the next hop egress interface in the reflection route. Because of the dynamic nature of reflection route table 306, reflection route table 306 may be stored in memory in logical router 102 and separate from routing table 308. However, in other examples, reflection route table 306 may be stored within routing table 308.

At 502, an entry before the request packet is received is shown. In the entry, a route referenced as a reflection route with route prefix of Fe80/16 is shown. The egress interface is empty, but reflection route processor 110 dynamically inputs the egress interface for the reflection route in reflection route table 306. Reflection route processor 110 may use the ingress interface in which the request packet was received and dynamically insert an identifier for that interface as the egress interface for the next hop in reflection route table 306. FIG. 5B depicts an example of reflection route table 306 after copying of the ingress interface to the egress interface of the reflection route according to some embodiments. For example, at 504, reflection route processor 110 has inserted the virtual network identifier of logical interface LIF1 108-1 of VNI #1 as the egress interface for the reflection route. Reflection route processor 110 dynamically inserts the entry at 504 after receiving the request packet.

After inserting the egress interface into reflection route table 306, referring back to FIG. 3, L3 services 304 may terminate the connection and perform the layer 3 service. Because the connection is terminated, packet handler 302 may generate the response packet that should be sent back to workload #1 106-1 instead of forwarding the request packet.

Upon L3 services 204 performing L3 services for the request packet, and then packet handler 302 generating a response packet for the request packet, packet handler 302 needs to set the egress interface. The response packet may include a layer 3 header that includes a source destination address of the local link address of logical router 102 and a destination address of the link local address of workload #1 106-1. Packet handler 302 recognizes that the destination address is the link local address of logical router 102 and determines that reflection route table 306 should be used for routing the response packet instead of routing table 308. Referring to FIG. 4, at 406, packet handler 302 looks up the reflection route in reflection route table 306 to retrieve the egress interface from the reflection route entry. For example, the entry at 504 in FIG. 5B is used to retrieve the egress interface. Then, at 408, packet handler 302 uses the virtual network identifier from the reflection route to forward the response packet to the egress interface in the response packet. For example, each logical interface 108 of logical router 102 may have its own egress pipeline that processes packets being sent by logical router 102.

At 410, logical router 102 may then forward the response packet on the egress interface to workload #1 106-1. The egress pipeline processes the response packet to deliver the response packet to the desired destination. In some embodiments, the response packet needs to have the destination MAC address in the layer 2 header still set. To determine the destination MAC address, logical interface LIF1 108-1 performs neighbor resolution on the link local address of workload #1 106-1 to determine the MAC address of workload #1 106-1. Because logical interface LIF1 108-1 is the logical interface connected to logical network 116-1, which includes workload #1 106-1, the resolution succeeds in discovering workload #1 106-1. If the egress pipeline of logical interface LIF2 108-2 performed the neighbor resolution, logical interface LIF2 108-2 would not be successful in discovering workload #1 106-2. Upon determining the destination MAC address, logical interface LIF1 108-1 can insert the MAC address of workload #1 106-1 in the destination MAC. Then, the packet is forwarded through logical switch #1 104-1 to workload #1 106-1 using the link local address of workload #1 106-1.

Accordingly, packet handler 302 thus uses reflection route processor 110 to store an identifier for the logical interface in which the request packet was received. By allowing the egress interface to be dynamically inserted for a reflection route when the request packet is received, reflection routes can be processed locally, and then the response packet properly forwarded through the correct logical interface 108. Response packets can be processed using the normal egress processing because logical router 102 sends response packets to the proper logical interface 108.

CONCLUSION

Accordingly, using the processing for the reflection route, logical router 102 may process packets in which local services are provided and then response packets are sent back to the originating workload through the correct logical interface. A reflection route table enables dynamic insertion of identifiers for logical interfaces that allows a unique identification of an egress interface for the response packet.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
    receiving, by a computing device, a packet from a first workload at a first logical interface of a logical router;
    determining, by the computing device, a destination address of the packet;
    determining, by the computing device, whether the packet is associated with a reflection route that routes a response packet back to the first workload or a route that routes the packet to another workload based on whether the destination address is a link local address of the logical router;
    when the packet is associated with the reflection route, performing:
        storing, by the computing device based on the packet being received at the first logical interface, a first identifier for the first logical interface as an egress interface, wherein the first logical interface and a second logical interface of the logical router share the link local address, and wherein the second logical interface is associated with a second identifier that is different from the first identifier;
        performing, by the computing device, a service for the packet and generating a response packet based on the service, the response packet including the link local address as the source address; and
        using, by the computing device, the first identifier to select the first logical interface as the egress interface to send the response packet back to the first workload; and
    when the packet is not associated with the reflection route, sending, by the computing device, the packet to a second workload based on the destination address.

2. The method of claim 1, wherein the link local address is an address that is uniquely confined to a link.

3. The method of claim 1, wherein performing the service comprises:
    performing a layer 3 service for the packet;
    determining the first identifier should be used to route the response packet; and
    using the first identifier to determine which of the first logical interface and the second logical interface to send the response packet.

4. The method of claim 1, wherein storing the first identifier comprises:
    dynamically storing the first identifier in an entry in a table upon receiving the packet; and
    retrieving the first identifier upon generating the response packet.

5. The method of claim 1, further comprising:
    sending the response packet to the first logical interface, wherein the first logical interface routes the response packet to the workload using the link local address of the workload.

6. The method of claim 1, wherein:
    the logical router includes a virtual media access control (VMAC) address, and
    the link local address for the first logical interface and the link local address for the second logical interface are generated based on the VMAC.

7. The method of claim 1, wherein the service is not performed by the logical router when the destination address of the packet is not the second link local address for the first logical interface of the logical router.

8. A non-transitory computer-readable storage medium containing instructions, that when executed, control a computer system to be operable for:
    receiving a packet from a first workload at a first logical interface of a logical router;
    determining a destination address of the packet;
    determining whether the packet is associated with a reflection route that routes a response packet back to the first workload or a route that routes the packet to another workload based on whether the destination address is a link local address of the logical router;
    when the packet is associated with the reflection route, performing:
        storing, based on the packet being received at the first logical interface a first identifier for the first logical interface as an egress interface, wherein the first logical interface and a second logical interface of the logical router share the link local address, and wherein the second logical interface is associated with a second identifier that is different from the first identifier;
        performing a service for the packet and generating a response packet based on the service, the response packet including the link local address as the source address; and
        using the first identifier to select the first logical interface as the egress interface to send the response packet back to the first workload; and
    when the packet is not associated with the reflection route, sending the packet to a second workload based on the destination address.

9. The non-transitory computer-readable storage medium of claim 8, wherein the first identifier for the first logical interface and the second identifier for the second logical interface uniquely identify the first logical interface and the second logical interface on the logical router.

10. The non-transitory computer-readable storage medium of claim 8, wherein performing the service comprises:
    performing a layer 3 service for the packet;
    determining the first identifier should be used to route the response packet; and using the first identifier to determine which of the first logical interface and the second logical interface to send the response packet.

11. The non-transitory computer-readable storage medium of claim 8, wherein storing the first identifier comprises:
dynamically storing the first identifier in an entry in a table upon receiving the packet; and
retrieving the first identifier upon generating the response packet.

12. The non-transitory computer-readable storage medium of claim 8, further comprising:
sending the response packet to the first logical interface, wherein the first logical interface routes the response packet to the workload using the link local address of the workload.

13. The non-transitory computer-readable storage medium of claim 8, wherein:
the logical router includes a virtual media access control (VMAC) address, and
the link local address for the first logical interface and the link local address for the second logical interface are generated based on the VMAC.

14. The non-transitory computer-readable storage medium of claim 8, wherein the service is not performed by the logical router when the destination address of the packet is not the second link local address for the first logical interface of the logical router.

15. An apparatus comprising:
one or more computer processors; and
a non-transitory computer-readable storage medium comprising instructions, that when executed, control the one or more computer processors to be operable for:
receiving a packet from a first workload at a first logical interface of a logical router;
determining a destination address of the packet;
determining whether the packet is associated with a reflection route that routes a response packet back to the first workload or a route that routes the packet to another workload based on whether the destination address is a link local address of the logical router;
when the packet is associated with the reflection route, performing:
storing, based on the packet being received at the first logical interface, a first identifier for the first logical interface as an egress interface, wherein the first logical interface and a second logical interface of the logical router share the link local address, and wherein the second logical interface is associated with a second identifier that is different from the first identifier;
performing a service for the packet and generating a response packet based on the service, the response packet including the first link local address as the source address; and
using the first identifier to select the first logical interface as the egress interface to send the response packet back to the first workload; and
when the packet is not associated with the reflection route, sending the packet to a second workload based on the destination address.

16. The apparatus of claim 15, wherein the first identifier for the first logical interface and the second identifier for the second logical interface uniquely identify the first logical interface and the second logical interface on the logical router.

17. The apparatus of claim 15, wherein performing the service comprises:
performing a layer 3 service for the packet;
determining the first identifier should be used to route the response packet; and
using the first identifier to determine which of the first logical interface and the second logical interface to send the response packet.

18. The apparatus of claim 15, wherein storing the first identifier comprises:
dynamically storing the first identifier in an entry in a table upon receiving the packet; and
retrieving the first identifier upon generating the response packet.

19. The apparatus of claim 15, further comprising:
sending the response packet to the first logical interface, wherein the first logical interface routes the response packet to the workload using the link local address of the workload.

20. The apparatus of claim 15, wherein:
the logical router includes a virtual media access control (VMAC) address, and
the link local address for the first logical interface and the link local address for the second logical interface are generated based on the VMAC.

21. The apparatus of claim 15, wherein the service is not performed by the logical router when the destination address of the packet is not the second link local address for the first logical interface of the logical router.

* * * * *